United States Patent
Jeong et al.

(10) Patent No.: US 9,080,664 B2
(45) Date of Patent: Jul. 14, 2015

(54) SHIFT LEVER OPERATING FORCE TRANSFERRING DEVICE OF MANUAL TRANSMISSION

(71) Applicant: Hyundai Motor Company, Seoul (KR)

(72) Inventors: Won Jin Jeong, Gyeonggi-do (KR); Woo Deok Kim, Seoul (KR); Deok Ki Kim, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 219 days.

(21) Appl. No.: 13/867,480

(22) Filed: Apr. 22, 2013

(65) Prior Publication Data

US 2014/0157932 A1 Jun. 12, 2014

(30) Foreign Application Priority Data

Dec. 6, 2012 (KR) ........................ 10-2012-0141393

(51) Int. Cl.
*B60K 20/00* (2006.01)
*G05G 9/00* (2006.01)
*F16H 59/04* (2006.01)

(52) U.S. Cl.
CPC ........... *F16H 59/04* (2013.01); *Y10T 74/20049* (2015.01)

(58) Field of Classification Search
CPC ....... F16H 61/36; F16H 59/10; F16H 59/042; F16H 59/04

USPC .................. 74/473.1, 473.15, 473.3, 473.36, 74/473.37

See application file for complete search history.

(56) References Cited

U.S. PATENT DOCUMENTS

| | | | |
|---|---|---|---|
| 4,143,560 A * | 3/1979 | Kinkade et al. ............ | 74/473.21 |
| 4,483,211 A * | 11/1984 | Hurlow ...................... | 74/473.15 |
| 5,063,810 A * | 11/1991 | Fujii .......................... | 74/473.15 |
| 5,144,854 A * | 9/1992 | Herzog et al. .............. | 74/473.22 |
| 6,021,687 A * | 2/2000 | Verdonschot ............. | 74/501.5 H |
| 7,694,603 B2 * | 4/2010 | Okadome .................. | 74/473.15 |

FOREIGN PATENT DOCUMENTS

| | | |
|---|---|---|
| JP | 2010-048356 A | 3/2010 |
| KR | 10-2004-0006326 A | 1/2004 |
| KR | 10-2009-0120557 | 11/2009 |
| KR | 10-2012-0016756 | 2/2012 |

* cited by examiner

*Primary Examiner* — Justin Krause
(74) *Attorney, Agent, or Firm* — Mintz Levin Cohn Ferris Glovsky and Popeo, P.C.; Peter F. Corless

(57) ABSTRACT

Disclosed herein is a shift lever operating force transferring device of a manual transmission. The device includes a shift cable that connects a shift lever with a control shaft. Furthermore, the shift cable absorbs vibration and shock transmitted to the shift lever. Additionally, the device includes a bush insertion groove in which a select bush 32 is inserted and a closing member configured to seal the bush insertion groove from the exterior.

11 Claims, 5 Drawing Sheets

SHIFT LEVER OPERATING FORCE TRANSFERRING DEVICE OF MANUAL TRANSMISSION

CROSS-REFERENCE TO RELATED APPLICATION

This application claims under 35 U.S.C. §119(a) the benefit of Korean Patent Application No. 10-2012-0141393 filed Dec. 6, 2012, the entire contents of which are incorporated herein by reference.

BACKGROUND (a) Technical Field

The present invention relates to a shift lever operating force transferring device of a manual transmission, and more particularly, to a shift lever operating force transferring device of a manual transmission which can reduce vibration transmitted to a shift lever from a transmission and prevent gear pop out when substantially large movement is generated in a transmission, and can improve durability by improving lubrication performance and preventing foreign substances from flowing into the operating parts of a shifting mechanism.

(b) Background Art

Some vehicle transmissions, as shown in FIG. 1, include a shift lever 1 for driver shifting, a control shaft 3 disposed in a transmission housing 2, and a shift lever operating force transferring device connecting the shift lever 1 with the control shaft 3.

The shift lever operating force transferring device is a shift rod 4 configured to carry the operation force for selecting and shifting from the shift lever 1 to the control shaft 3. The shift lever 1 has a ball portion 1a disposed at the lower end for selecting and shifting, and rotatably inserted in a lever housing 5 and the lever housing 5 is fixed to a vehicle body.

A lever pipe 6 is integrally formed above the ball portion 1a in the shift lever 1, a U-shaped rear yoke 4a at one end of the shift rod 4 is coupled to the lever pipe 6 by a hinge shaft 7, and a front yoke 4b at the other end of the shift rod 4 is connected with the control shaft 3. The reference numeral 8 not stated above indicates an extension rod.

Therefore, as a driver makes selecting and shifting operations, by adjusting the shift lever 1, the shift rod 4, receiving the operation force through the lever pipe 6 and the rear yoke 4a, operates the control shaft 3 while axially rotating R1 and moving longitudinally, thereby performing a shifting operation. However, the shift rod 4 of the related art used as a shift lever operating force transferring device is a rigid body, so the device may not absorb vibration of the transmission and may transmit the vibration to the shift lever 1, and accordingly, vibration may be exerted in the shift lever 1.

Further, the rigid shift lever 4 may not absorb substantially large movement (e.g., due to sudden acceleration or passing over a projection on the road) of a transmission which is generated while a vehicle travels and transmits the movement to the shift lever 1, thus gear pop out may occur, wherein a gear is shifted to a neutral position by adjustment of the shift lever 1 despite driver intention.

The description provided above as a related art of the present invention is merely for helping understanding the background of the present invention and should not be construed as being included in the related art known by those skilled in the art.

SUMMARY

The present invention provides a shift lever operating force transferring device of a manual transmission which may decrease transmission of vibration generated by a transmission and decrease shock caused by movement of a transmission to a shift rod by absorbing the vibration and shock, thus decreasing vibration of a shift lever, to prevent gear pop out which occurs when a gear is shifted to a neutral position despite driver intention. The present invention additionally may prevent foreign substances from flowing into the operation part of a shifting mechanism connecting a shift cable with a control shaft, and may improve durability of the device by improving lubrication performance.

According to an embodiment of the present invention, a shift lever operating force transferring device of a manual transmission, may connect a shift lever with a control shaft and may be configured to transmit operation forces for selecting and shifting through the shift lever to the control shaft. The device may include a shift cable having one end connected with a shift lever and configured to transmit operation force while moving during selecting or shifting through the shift lever; a shifting mechanism coupled to a control shaft, connected with the shift cable, configured to rotate relative to the transmission housing for shifting by axially rotating the control shaft during selecting through the shift lever, and configured to move the control shaft for a shifting operation through the shift lever; and a closing member disposed at the connecting portion of a select lever bracket and a shift connector bracket of the shifting mechanism, wherein the closing member is configured to prevent foreign substances from flowing into the connecting portion.

The shift cable may include: a select cable configured to rotate the shifting mechanism while moving during a selecting operation through the shift lever; and a shift cable configured to move the shifting mechanism during a shifting operation through the shift lever.

The shifting mechanism may include: the select lever bracket connected with the select cable, rotatably coupled to a hinge bracket fixed to the transmission housing, wherein the select lever bracket is configured to rotate relative to the transmission housing during a selecting operation through the shift lever; and the shift connector bracket where the select lever bracket may be fitted, where the shift cable and the control shaft may be connected, which may be configured to rotate with the select lever bracket to allow the control shaft to axially rotate during a selecting operation through the shift lever, and to move the control shaft while moving relative to the select lever bracket during a shifting operation through the shift lever.

The select lever bracket may include: a select cable coupling portion having a select pin where the select cable may be coupled; a shift connector coupling portion having a select bush through a stud for coupling the shift connector bracket; and a middle portion disposed between the select cable coupling portion and the shift connector coupling portion and rotatably coupled to the hinge bracket through a rotary shaft.

The shift connector bracket may include: a shift cable coupling portion having a shift pin where the shift cable is coupled; a control shaft coupling portion that extends in the longitudinal direction of the shift cable and wherein one end of the control shaft may be coupled by a bolt; and a bush coupling portion having a bush insertion aperture extending into a space where the shift connector and the select bush are fitted, in the longitudinal direction of the control shaft.

The select bush and the bush insertion aperture may be formed in a shape that transmits a rotational force of the select lever bracket to the shift connector bracket to rotate the shift connector bracket when the select lever bracket rotates about the rotary shaft.

The bush insertion groove may be formed in the shape of a cylinder, open to the select lever bracket, the closing member may be coupled to the select bush coupling portion by a gasket member to close the opening of the bush insertion groove, and the shift connector coupling portion and the select bush may be disposed in the bush insertion groove hermetically through the closing member.

The dimension of the bush insertion groove may be greater than the dimension of the select bush to allow the connector bracket to move in the longitudinal direction of the control shaft during a shifting operation through the shift lever. The closing member may be made of elastic rubber in a bellows shape to absorb movement of the shift connector bracket in a shifting operation through the shift lever. A clip member configured to hold the rotary shaft, wherein the clip member may be coupled to the end of the rotary shaft which passes through the hinge bracket. A shaft aperture through which the rotary shaft passes in the hinge bracket may be filled with a lubricant to prevent wear, an upper bearing and a lower bearing may be configured to prevent lubricant leakage and may be fixed at the upper portion and the lower portion, respectively, in the shaft aperture, and the rotary shaft may be disposed through the shaft aperture while passing through the upper bearing and the lower bearing.

BRIEF DESCRIPTION OF THE DRAWINGS

The above and other features of the present invention will now be described in detail with reference to exemplary embodiments thereof illustrated the accompanying drawings which are given hereinbelow by way of illustration only, and thus are not limitative of the present invention, and wherein:

FIG. 4 is an exemplary rear view of FIG. 3 according to an exemplary embodiment of the present invention;

Figure 1:
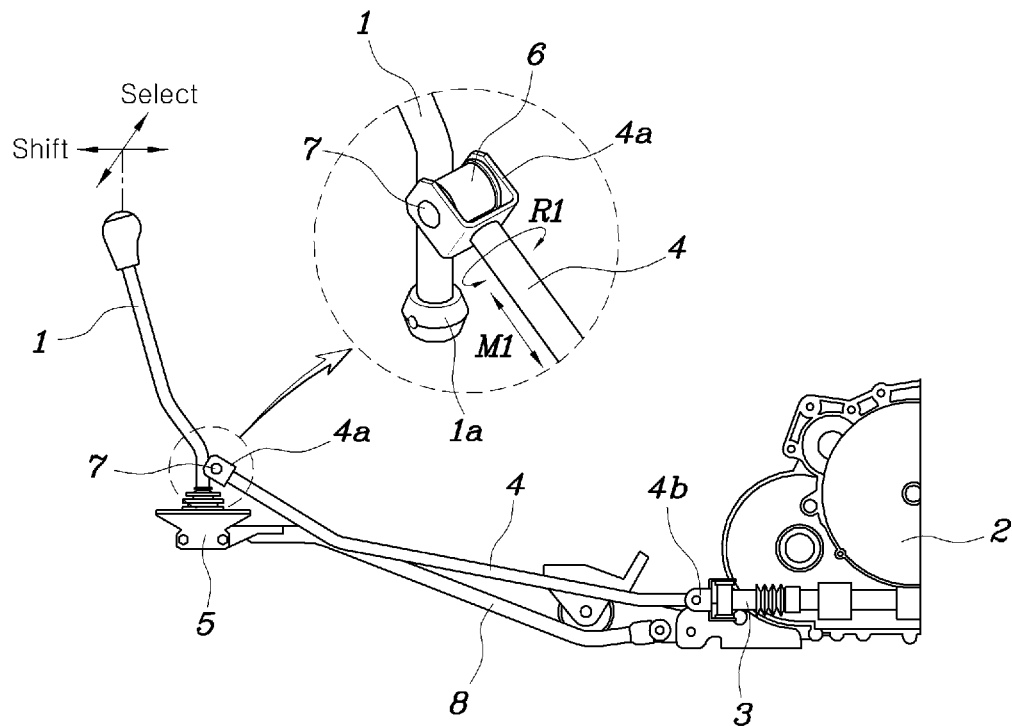
FIG. 1 is an exemplary view illustrating a shift lever operating force transferring device according to the related art.

It should be understood that the accompanying drawings are not necessarily to scale, presenting a somewhat simplified representation of various exemplary features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

A shift lever operating force transferring device of a manual transmission according to embodiments of the present invention is described hereafter in detail with reference to the accompanying drawings.

Figure 2:
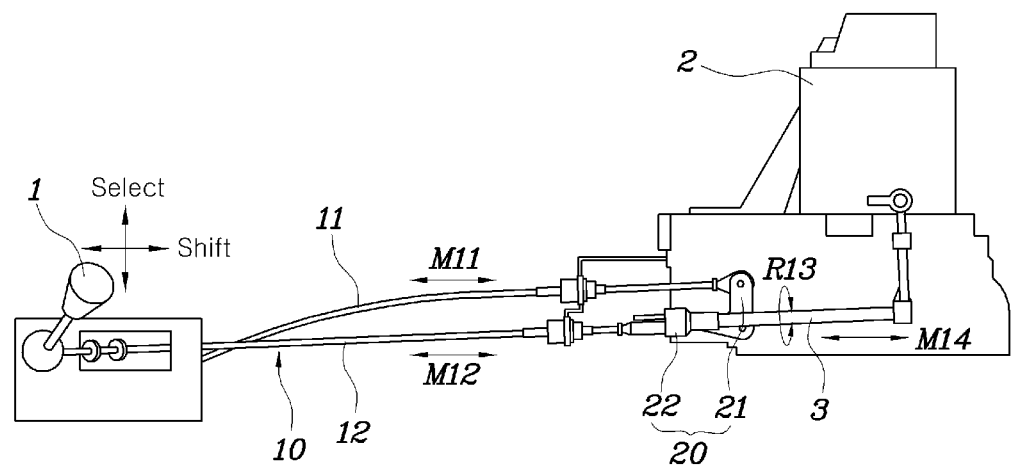
FIG. 2 is an exemplary view showing when a shift lever operating force transferring device is installed according to an exemplary embodiment of the present invention.
Figure 3:
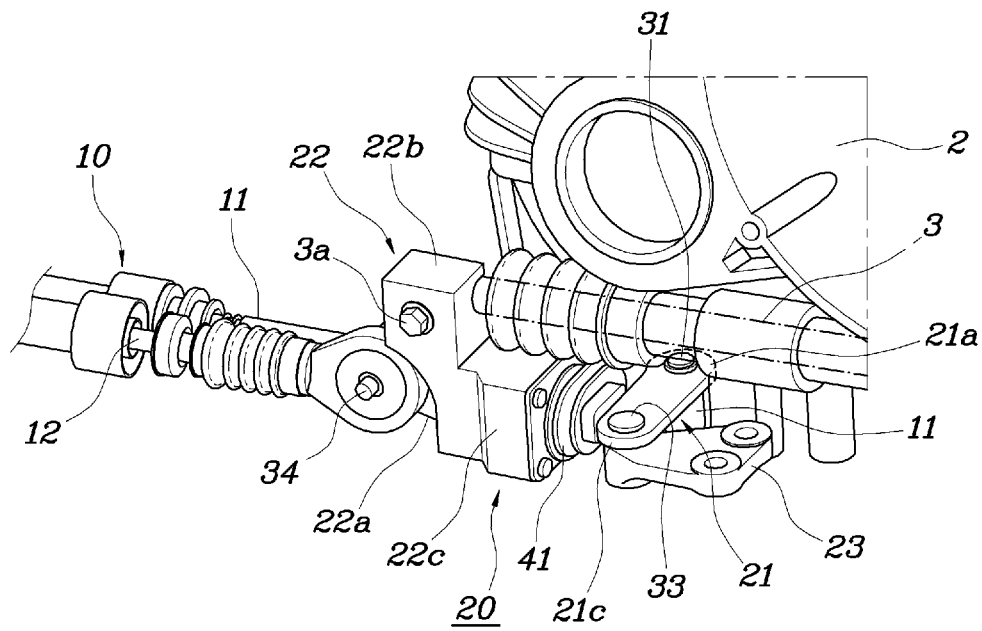
FIGS. 3 and 4 are exemplary views showing installation status of a shifting mechanism according to an exemplary embodiment of the present invention.
Figure 4:
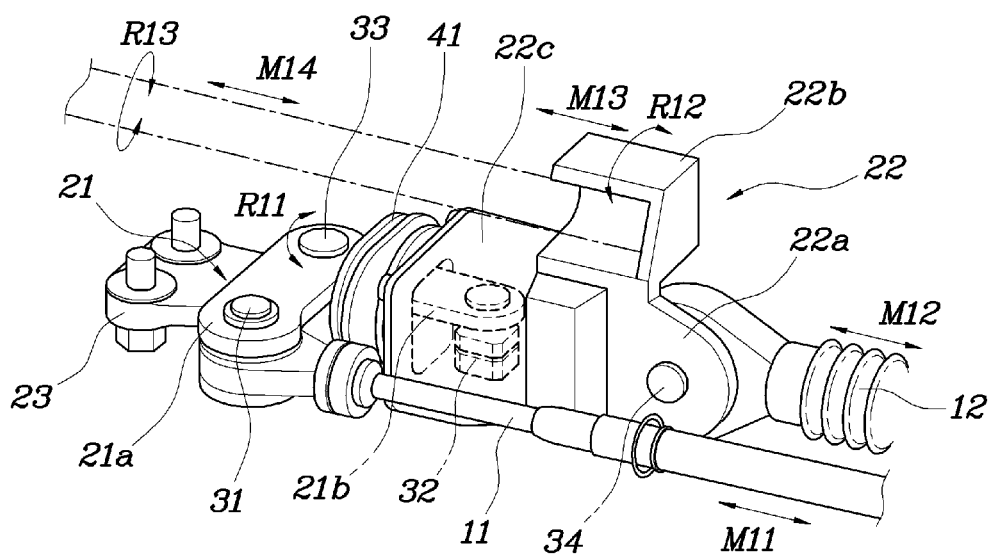
Figure 5:
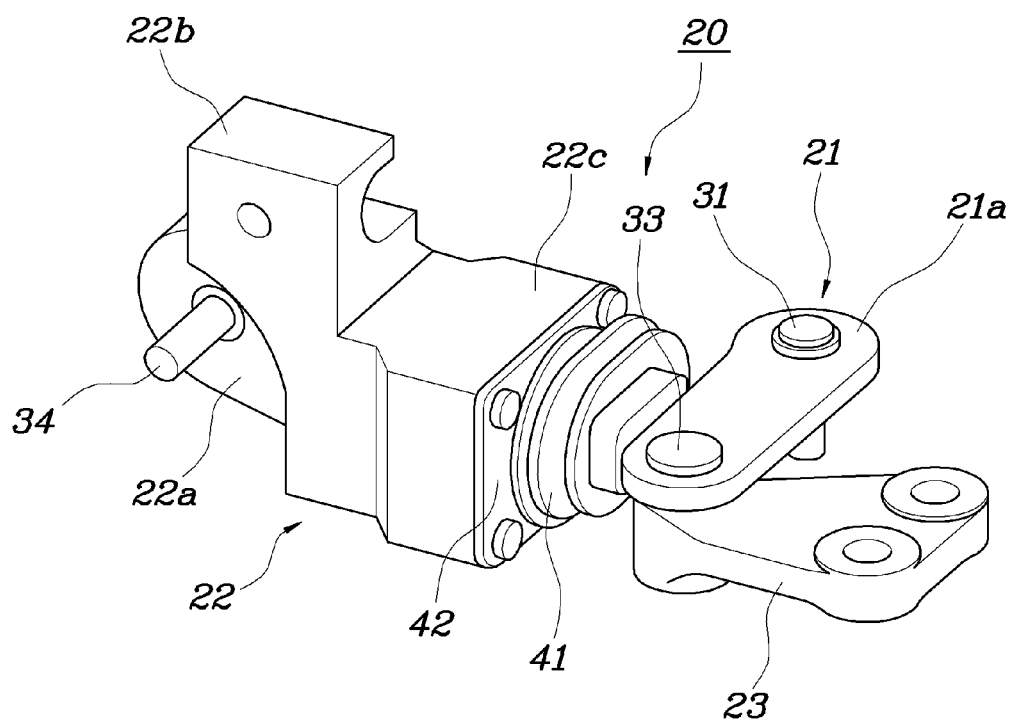
FIGS. 5 and 6 are exemplary detailed views showing the combination status of the shifting mechanism according to an exemplary embodiment the present invention.
Figure 6:
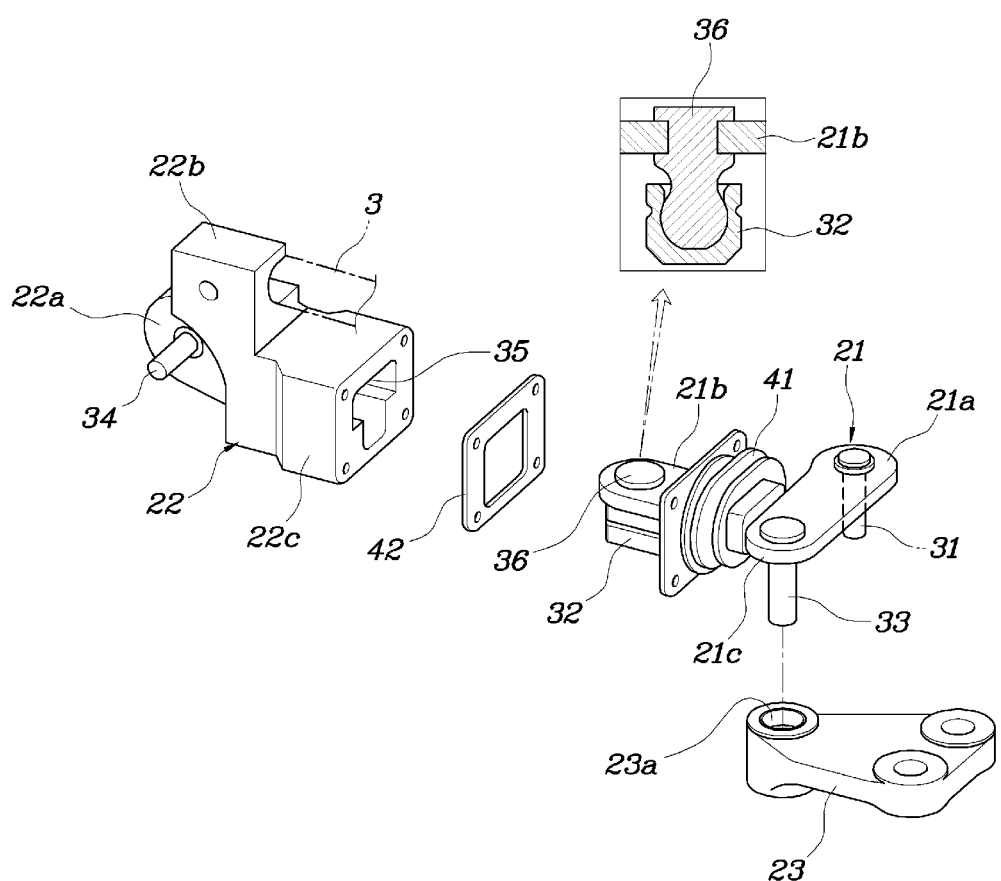
Figure 7:
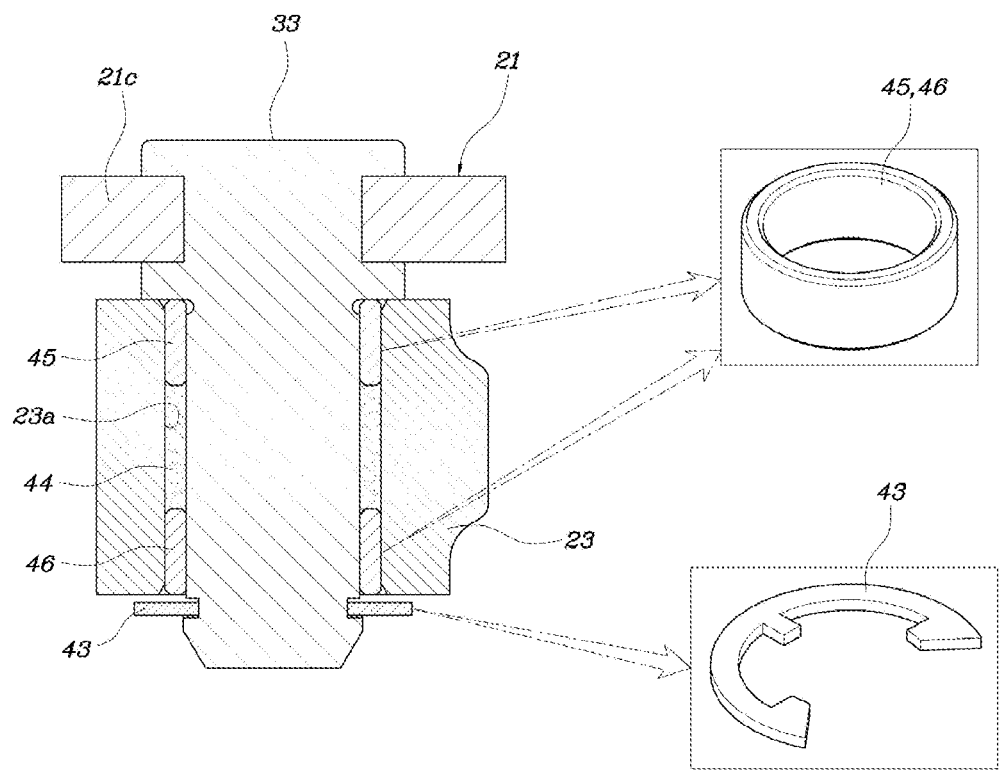
FIG. 7 is an exemplary cross-sectional view illustrating the combination structure of a rotary shaft according to an exemplary embodiment of the present invention.

Generally, vehicle transmissions, as shown in FIG. 2, include a shift lever for driver shifting operations, a control shaft disposed within a transmission housing 2, and a shift lever operating force transferring device connecting the shift lever 1 with the control shaft 3.

A shift lever operating force transferring device according to the present invention, as shown in FIGS. 2 to 7, may include a shift cable 10 having one end connected with a shift lever 1 and configured to transmit operation force while moving during a selecting or shifting operation through the shift lever 1; a shifting mechanism 20 coupled to a control shaft 3, connected with the shift cable 10, configured to rotate relative to the transmission housing 2 for shifting by axially rotating the control shaft 3 during a selecting operation through the shift lever 1, and configured to move the control shaft 3 for shifting during a shifting operation through the shift lever 1; and a closing member 41 disposed at the connecting portion of a select lever bracket 21 and a shift connector bracket 22 of the shifting mechanism 20, wherein the closing member may be configured to prevent foreign substances from flowing into the connecting portion.

The shift cable 10 may include a select cable 11 configured to rotate the shifting mechanism 20 while moving substantially linearly during the selecting operation through the shift lever 1; and a shift cable 12 configured to move the shifting mechanism 1 substantially linearly while moving during the shifting operation through the shift lever 1.

As described above, since the shift lever 1 and the control shaft 3 are connected by the shift cable 10, the shift cable 10 which may be substantially flexible, may absorb vibration sufficiently, when the vibration generated from a transmission is transmitted to the shift lever 1, the vibration of the shift lever 1 may decrease.

Further, since the shift cable 10 may absorb a substantially sudden movement (e.g., movement due to sudden acceleration and passing over a projection on a road) of the transmission which may be generated while a vehicle travels, it may be possible to prevent gear pop out. Specifically, gear pop up may occur when a gear is moved to a neutral position due to a substantially sudden movement of the transmission by movement of the shift lever 1 despite driver intention.

Moreover, the shifting mechanism 20 according to the present invention may include: a select lever bracket 21 connected with the select cable 11, rotatably coupled to a hinge bracket 23 fixed to the transmission housing 2, and may be configured to rotate relative to the transmission housing 2 during a selecting operation through the shift lever 1; and the shift connector bracket 22 to which the select lever bracket 21 is fitted and where the shift cable 12 and the control shaft 3 are connected, may be configured to rotate with the select lever bracket 21 to allow the control shaft 3 to be axially rotated during the selecting operation through the shift lever 1, and may be configured to move the control shaft 3 substantially linearly while moving substantially linearly relative to the select lever bracket 1 during a shifting operation through the shift lever 1. As the shift lever 1 is operated for shifting, the shift connector bracket 22 may be configured to move substantially linearly with the control shaft 3 in the longitudinal direction of the control shaft 3.

The select lever bracket 21 may include: a select cable coupling portion 21a including a select pin 31 to which the select cable 11 is coupled; a shift connector coupling portion 21b including a select bush 32 coupled to a stud 36 for coupling the shift connector bracket 22; and a middle portion 21c disposed between the select cable coupling portion 21a and the shift connector coupling portion 21b and configured to be coupled to the hinge bracket 23 through a rotary shaft 33.

The select cable coupling portion 21a and the shift connector coupling portion 21b may protrude and bend in the opposite directions from the middle portion 21c, however the invention is not limited thereto and thus the select cable coupling portion 21a and the shift connector coupling portion 21b may bend in the same direction from the middle portion 21c.

The shift connector bracket 22 may include: a shift cable coupling portion 22a including a shift pin 34 to which the shift cable 12 may be coupled; a control shaft coupling portion 22b that extends in the longitudinal direction of the shift cable 12 and wherein one end of the control shaft 3 may be coupled by a bolt 3a; and a bush coupling portion 22c including a bush insertion groove 35 extending into a space where the shift connector 21b and the select bush 32 are fitted, in the longitudinal direction of the control shaft 3.

The select bush 32 and the bush insertion groove 35 may be formed in a shape to transmit a rotational force of the select lever bracket 21 to the shift connector bracket 22 to rotate the shift connector bracket 22 when the select lever bracket 21 rotates about the rotary shaft 33. In other words, the select bush 32 may be formed in a hexahedral shape and the bush insertion groove 35 may be formed in a rectangular shape into which a hexahedron may be fitted, but the present invention is not limited thereto.

Moreover, the bush insertion groove 35 may be formed in the shape of a cylinder open toward the select lever bracket 21, the closing member 41 may be coupled to the select bush coupling portion 22c by a gasket member 42 to close the opening of the bush insertion groove 35, and the shift connector coupling portion 21b and the select bush 32 may be disposed within the bush insertion groove 35 hermetically through the closing member 41.

When the closing member 41 is disposed at the inlet of the bush insertion groove 35, the bush insertion groove 35 may maintain a seal (e.g., hermetical) from the exterior, to prevent foreign substances (e.g., dust and stones) from flowing into the bush insertion groove 35 from the exterior.

When foreign substances flow into the bush insertion groove 35 from the exterior, the select bush 32 and the bush insertion groove 35 may be worn by the foreign substances during the selecting operation, and the operation force for the selecting operation may not be smoothly transmitted between the select lever bracket 21 and the shift connector bracket 22.

However, according to the present invention, the bush insertion groove 35 may maintain a sufficient seal using the closing member 41, to prevent foreign substances from flowing into the bush insertion groove 35, and accordingly, it may be possible to prevent wear of the parts and to improve durability.

Further, the longitudinal dimension of the bush insertion groove 35 (e.g., dimension in the longitudinal direction of the control shaft) may be greater than the dimension of the select bush 32 to allow the connector bracket 22 to move linearly in the longitudinal direction of the control shaft 3 in shifting through the shift lever 1.

Further, the closing member 41 may be made of elastic rubber in an elliptical shape to absorb substantially linear movement of the shift connector bracket 22 during the shifting operation through the shift lever 1. When the closing member 41 may not absorb substantially linear movement of the shift connector bracket 22, the operation force for shifting from the shift lever 1 may not be transmitted sufficiently to the control shaft 3.

Further, a clip member 43 configured to hold the rotary shaft 33 may be coupled to the end of the rotary shaft 33 which may pass through the hinge bracket 23. Further, a shaft aperture 23a through which the rotary shaft 33 passes in the hinge bracket 23 may be filled with a lubricant 44 to prevent wear; an upper bearing 45 and a lower bearing 46 configured to prevent lubricant 44 leakage may be fixed at the upper portion and the lower portion, respectively, in the shaft aperture 23a, and the rotary shaft 33 may be disposed through the shaft aperture 23a while passing through the upper bearing 45 and the lower bearing 46. The lubricant 44, may be configured to rotate the rotary shaft 33 more smoothly and prevent wear of the parts due foreign substances (e.g., dust etc.), thereby improving durability. The lubricant may be grease but the present invention is not limited thereto.

The selecting and shifting operations by the device of the present invention are described hereafter.

As a driver operates the shift lever 1 for a selecting operation, the select cable 11 may be configured to move substantially linearly (arrow M11) and apply force to the select pin 31, and the select lever bracket 21 may be configured to rotate relative to the hinge bracket 23 about the rotary shaft 33 (arrow R11). As the select lever bracket 21 rotates about the rotary shaft 33, the select bush 32 fitted in the bush insertion groove 35 may be configured to apply force to the shift connector bracket 22, to axially rotate the shift connector bracket 22, as indicated by an arrow R12 shown in FIG. 2. Accordingly, the select lever bracket 21 may be fitted to the shift connector bracket 22 and the control shaft 3 may correspondingly axially rotate (arrow R13) thereby shifting by the selecting operation.

When the driver operates the shift lever 1 for a shifting operation after the selecting operation is complete, the shift cable 12 may be configured to move substantially linearly (arrow M12) while the shift connector 22 moves substantially linearly in the longitudinal direction of the control shaft 3, as indicated by the arrow M13. The straight movement of the shift connector bracket 22 may be possible due to the bush insertion groove 35 formed in the longitudinal direction of the control shaft 3 being larger than the select bush 32. As the shift connector bracket 22 moves substantially linearly in the longitudinal direction of the control shaft 3, as described above, the control shaft 3 integrally fitted in the shift connector bracket 22 may correspondingly move substantially linearly (arrow M14), to perform the shifting operation.

As described above, in a manual transmission according to the present invention, the shift lever 1 and the control shaft 3 may be connected by the shift cable 10, the shift cable 10 may sufficiently absorb vibration and shock transmitted to the shift lever 1, and accordingly vibration of the shift lever 1 may decrease, and particularly, a gear pop out may be prevented.

Further, the control shaft 3 may be moved substantially linearly and shifting may be performed by the substantially linear movement of the select cable 11 during a selecting operation through the shift lever 1 in the present invention, whereas the control shaft 3 may be moved and shifting may be performed by rotation of the shift load 4 during a selecting operation through the shift lever 1 in the related art; thus, the rotation of the shift rod 4 may be converted into substantially linear movement of the select cable 11, to reduce the operation force from the driver.

Further, according to the present invention, the bush insertion groove 35 into which the select bush 32 may be inserted may be blocked from the exterior using the closing member 41, to prevent foreign substances from flowing into the bush insertion groove 35 and accordingly wear of the parts may be prevented and durability may be improved.

Further, according to the present invention, since the shaft aperture 23a of the hinge bracket 23 through which the rotary shaft 33 passes may be filled with the lubricant 44, the rotary shaft 33 may rotate more smoothly and the wear of the parts due to foreign substances may be prevented, thus improving durability.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A shift lever operating force transferring device of a manual transmission, comprising:
   a shift lever connected to a control shaft and configured to transmit operation forces for a selecting operation and a shifting operation to the control shaft;
   a shift cable having one end connected to the shift lever and the other end connected to the control shaft, wherein the shift cable is configured to transmit the operation forces while moving substantially linearly during the selecting and shifting operations through the shift lever;
   a shifting mechanism coupled to the control shaft and configured to rotate relative to a transmission housing for shifting by axially rotating the control shaft during the selecting operation through the shift lever, and moving the control shaft substantially linearly during the shifting operation through the shift lever; and
   a closing member disposed at a connecting portion of a select lever bracket and a shift connector bracket of the shifting mechanism and configured to prevent foreign substances from flowing into the connecting portion.

2. The device of claim 1, wherein the shift cable comprises:
   a select cable configured to rotate the shifting mechanism while moving substantially linearly during the selecting operation through the shift lever; and
   a shift cable configured to move the shifting mechanism substantially linearly while moving substantially linearly during the shifting operation through the shift lever.

3. The device of claim 2, wherein the select lever bracket is connected with the select cable and rotatably coupled to a hinge bracket fixed to the transmission housing, and is configured to rotate relative to the transmission housing during the selecting operation through the shift lever; and the shift connector bracket to which the select lever bracket is fitted, is configured to rotate with the select lever bracket to axially rotate the control shaft during the selecting operation through the shift lever, and move the control shaft substantially linearly while moving substantially linearly relative to the select lever bracket during the shifting operation through the shift lever.

4. The device of claim 1, wherein the closing member is made of elastic rubber in an elliptical shape to absorb linear movement of the shift connector bracket during the shifting operation through the shift lever.

5. The device of claim 3, wherein the select lever bracket includes:
   a select cable coupling portion having a select pin to which the select cable is coupled;
   a shift connector coupling portion having a select bush connected to a stud; and
   a middle portion disposed between the select cable coupling portion and the shift connector coupling portion and rotatably coupled to the hinge bracket through a rotary shaft.

6. The device of claim 5, further comprising:
   a clip member configured to hold the rotary shaft, wherein the clip member is coupled to an end of the rotary shaft which passes through the hinge bracket.

7. The device of claim 5, further comprising:
   a shaft aperture through which the rotary shaft is disposed is filled with a lubricant;
   an upper bearing and a lower bearing configured to prevent lubricant leakage are fixed to an upper portion and a lower portion of the shaft aperture.

8. The device of claim 5, wherein the shift connector bracket comprises:
   a shift cable coupling portion having a shift pin to which the shift cable is coupled;
   a control shaft coupling portion that extends in the longitudinal direction of the shift cable and to which one end of the control shaft is coupled by a bolt; and
   a bush coupling portion having a bush insertion aperture extending into a space where the shift connector and the select bush are fitted, in the longitudinal direction of the control shaft.

9. The device of claim 8, wherein the select bush and the bush insertion aperture are formed in a shape that transmits a rotational force of the select lever bracket to the shift connector bracket to rotate the shift connector bracket when the select lever bracket rotates about the rotary shaft.

10. The device of claim 8, wherein a bush insertion groove is a formed in the shape of a cylinder open toward the select lever bracket, the closing member is coupled to the select bush coupling portion by a gasket member to close the opening of the bush insertion groove, and the shift connector coupling portion and the select bush are positioned to seal the bush insertion groove using the closing member.

11. The device of claim 10, wherein a dimension of the bush insertion groove is greater than a dimension of the select bush to allow the connector bracket to move substantially linearly in the longitudinal direction of the control shaft during the shifting operation through the shift lever.

* * * * *